United States Patent
Weh et al.

(10) Patent No.: US 10,378,623 B2
(45) Date of Patent: Aug. 13, 2019

(54) ROTATION/TRANSLATION CONVERTER GEAR UNIT

(71) Applicant: Robert Bosch GmbH, Stuttgart (DE)

(72) Inventors: Andreas Weh, Sulzberg (DE); Matthias Mayr, Rettenberg (DE); Andreas Ohm, Kupferzell (DE); Andreas Deberling, Erdmannhausen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 316 days.

(21) Appl. No.: 15/224,145

(22) Filed: Jul. 29, 2016

(65) Prior Publication Data

US 2017/0030445 A1    Feb. 2, 2017

(30) Foreign Application Priority Data

Jul. 31, 2015  (DE) .................. 10 2015 214 584

(51) Int. Cl.
| | |
|---|---|
| *F16H 25/22* | (2006.01) |
| *B60T 11/10* | (2006.01) |
| *F15B 15/14* | (2006.01) |
| *F16H 1/28* | (2006.01) |
| *F04B 9/02* | (2006.01) |
| *F04B 9/04* | (2006.01) |
| *B60T 13/74* | (2006.01) |
| *B60T 8/40* | (2006.01) |
| *F16H 25/20* | (2006.01) |

(52) U.S. Cl.
CPC ........ *F16H 25/2204* (2013.01); *B60T 8/4018* (2013.01); *B60T 11/102* (2013.01); *B60T 13/745* (2013.01); *F04B 9/02* (2013.01); *F04B 9/047* (2013.01); *F15B 15/14* (2013.01); *F16H 1/2836* (2013.01); *F16H 1/2845* (2013.01); *F15B 2015/1495* (2013.01); *F16H 2025/2075* (2013.01); *F16H 2025/2087* (2013.01)

(58) Field of Classification Search
CPC .. F16H 25/2204; F16H 1/2836; B60T 11/102; B60T 13/745
USPC .................. 92/136; 475/140, 141, 191, 264
See application file for complete search history.

(56) References Cited

U.S. PATENT DOCUMENTS

| | | | |
|---|---|---|---|
| 5,263,906 A * | 11/1993 | Antonov ................. | F16D 13/74 475/257 |
| 6,767,305 B2 * | 7/2004 | Backes .................... | F16D 65/18 188/161 |

(Continued)

FOREIGN PATENT DOCUMENTS

WO    WO 2014086517 A1 *  6/2014  ............ B60T 8/4018

*Primary Examiner* — Thomas E Lazo
*Assistant Examiner* — Richard C Drake
(74) *Attorney, Agent, or Firm* — Norton Rose Fulbright US LLP; Gerard Messina

(57) ABSTRACT

A rotation/translation converter gear unit having a helical gear and a planetary gear for driving the helical gear. A spindle nut of the helical gear forms a planet carrier for planet wheels of the planetary gear. Situated between the planetary gear and the helical gear is an axial friction bearing, that at the same time forms a centering element which centers a sun wheel of the planetary gear between the planet wheels. In particular, the rotation/translation converter gear unit is used to drive a piston of a pressure generator for a brake control of a hydraulic vehicle brake system.

10 Claims, 2 Drawing Sheets

(56) References Cited

U.S. PATENT DOCUMENTS

| | | | | |
|---|---|---|---|---|
| 7,041,022 B2* | 5/2006 | Bock | B62D 5/008 475/339 |
| 7,871,084 B2* | 1/2011 | Hakui | B60G 7/006 280/5.521 |
| 7,950,300 B2* | 5/2011 | Murata | F16H 25/20 74/25 |
| 8,818,672 B2* | 8/2014 | Takeda | B60T 13/745 303/10 |
| 8,960,690 B2* | 2/2015 | Hinohara | B62D 17/00 280/5.522 |
| 9,568,026 B2* | 2/2017 | Yoshimoto | F15B 15/08 |
| 9,868,423 B2* | 1/2018 | Weh | F04B 9/047 |
| 2003/0148846 A1* | 8/2003 | Reimann | B62D 5/008 475/207 |
| 2004/0023751 A1* | 2/2004 | Butsch | F16H 1/2836 475/346 |
| 2010/0050796 A1* | 3/2010 | Eschborn | B63B 19/24 74/89.37 |
| 2010/0197445 A1* | 8/2010 | Montestruc | F16H 1/2836 475/346 |
| 2010/0261571 A1* | 10/2010 | Matsuoka | F16H 1/2827 475/331 |
| 2014/0212316 A1* | 7/2014 | Morselli | F04C 2/16 418/202 |
| 2014/0322060 A1* | 10/2014 | Takeda | F04C 2/18 418/201.3 |
| 2015/0322931 A1* | 11/2015 | Weh | B60T 8/4018 417/415 |
| 2016/0068146 A1* | 3/2016 | Matsunaga | B60T 1/10 60/545 |
| 2017/0080906 A1* | 3/2017 | Rehfus | B60T 7/12 |

* cited by examiner

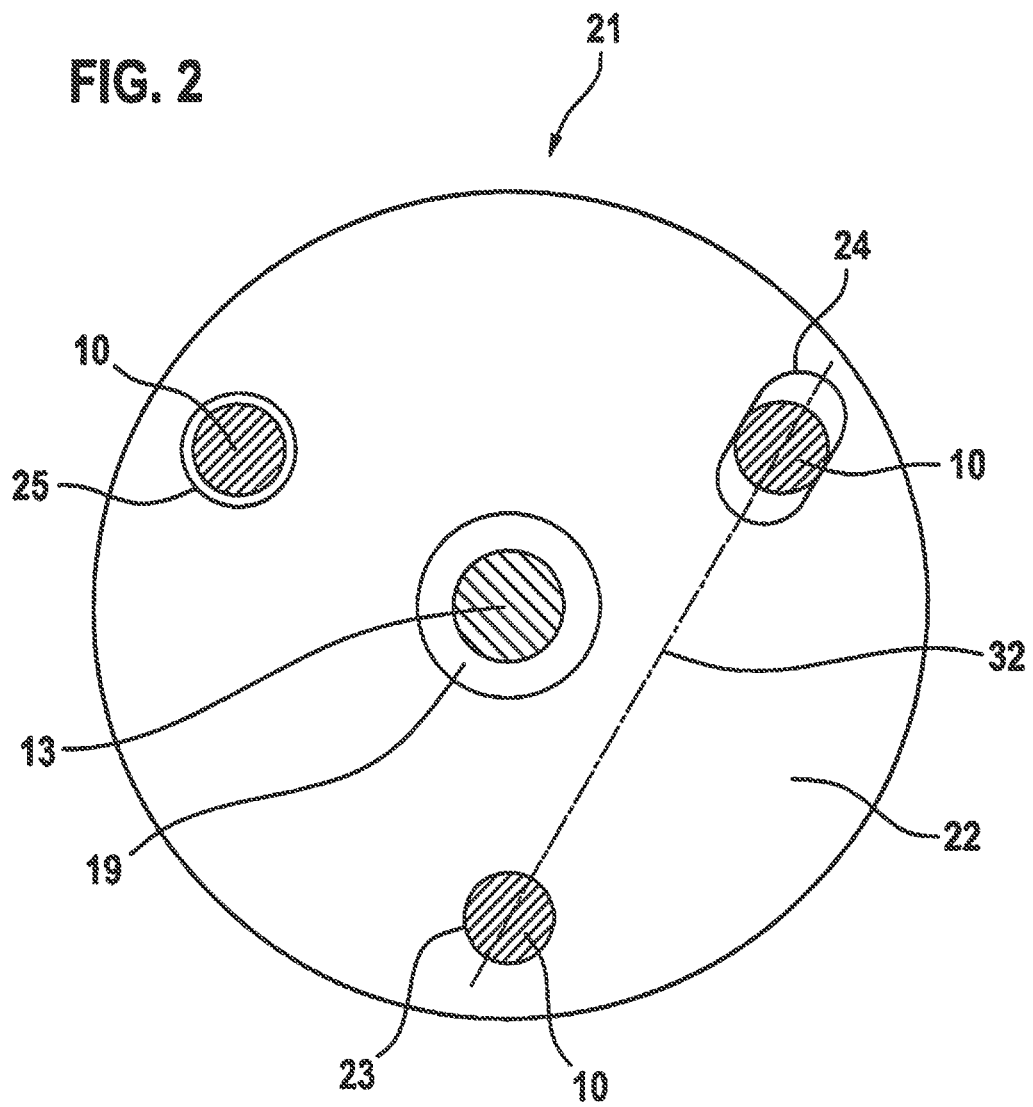

ROTATION/TRANSLATION CONVERTER GEAR UNIT

CROSS REFERENCE

The present application claims the benefit under 35 U.S.C. § 119 of German Patent Application No. DE 102015214584.0 filed on Jul. 31, 2015, which is expressly incorporated herein by reference in its entirety.

BACKGROUND INFORMATION

The present invention relates to a rotation/translation converter gear unit. "Converter" relates to the conversion of a rotation into a translation. The rotation/translation converter gear unit of the present invention has a helical gear that converts a rotary drive movement into a translatory output movement, i.e., into a displacement, and a planetary gear for rotational driving of the helical gear.

Conventional helical gears may have, for example, a spindle and a spindle nut whose internal thread engages with a thread of the spindle. By rotational driving of the spindle nut or of the spindle, the other part, thus, the spindle or the spindle nut, is shifted axially. In addition to having gliding threads, there are also screw drives having rolling elements, e.g., as ball screw drives or roller screw drives. In general, the spindle nut or the spindle may also be a rotatable, axially fixed member of a helical gear having a thread, and the other part, thus, the spindle or the spindle nut, as an axially displaceable, rotatably fixed member of a helical gear having a mating thread. The thread and the mating thread engage directly and indirectly, e.g., via rolling elements, so that rotational driving of the rotatable member of the helical gear axially displaces the axially displaceable member.

Conventional planetary gears may have a sun wheel, planet wheels that mesh with the sun wheel and, in response to rotational driving, rotate and circle the sun wheel, and having an internal gear, concentrically encircling the sun wheel, with which the planet wheels likewise mesh and in which they rotate in response to rotational driving. The planet wheels are mounted eccentrically and rotatably on a planet carrier that is disposed co-axially with respect to the sun wheel and the internal gear.

SUMMARY

An example rotatable member of the helical gear of the rotation/translation converter gear unit according to the present invention may have a planet carrier on which planet wheels of the planetary gear are eccentrically and rotationally mounted. The planet carrier may be disposed in rotatably fixed, preferably rigid manner on the rotatable member of the helical gear. The rotatable member of the helical gear may itself also form the planet carrier by having shafts, for example, that are disposed eccentrically and on which the planet wheels are rotationally mounted.

In addition, the rotation/translation converter gear unit of the present invention has a centering device that centers a sun wheel of the planetary gear between the planet wheels. The centering device may also center shafts of the sun wheel and/or of the planet wheels. Preferably, the centering device is made of a single, e.g., disk-shaped component.

In various refinements of the present invention, the centering device has holes for the shafts of the planet wheels and of the sun wheel. The holes in the centering device establish a position of the shaft of the sun wheel in relation to the shafts of the planet wheels. The shafts of the planet wheels are secured in position relative to each other by the planet carrier.

A further refinement according to the example embodiment of the present invention provides that the centering device has a locating hole for a shaft of one planet wheel, the locating hole aligning the centering device on this shaft. The present invention describes a hole as a locating hole which is with no clearance or with narrow bearing clearance on the shaft of the one planet wheel.

In addition, the centering device has an elongated hole for a shaft of another planet wheel, that is free from play with respect to the shaft in the lateral direction or has a narrow bearing clearance in the lateral direction. A longitudinal centerline of the elongated hole extended beyond the elongated hole intersects an axis of the locating hole. Together with the locating hole, the elongated hole retains the centering device in rotatably fixed manner, and sets an angular position of the centering device. The centering device is secured in position on the shafts of two planet wheels by the locating hole and the elongated hole, which permits the desired centering of the sun wheel of the planetary gear in relation to the planet wheels. As already said, the shafts of one or more further planet wheels are secured in position in relation to the shafts of the one and the other planet wheel by the planet carrier. For one or more such further shafts of one or more planet wheels, the centering device has one or more further holes that are larger than cross-sections of the shafts, or the centering device lets these shafts free. The centering device is aligned on the shafts of the one and the other planet wheel, without overdetermining of a third or even further shafts.

One development of the present invention provides that the centering device has a pivot bearing for the sun wheel.

In accordance with the present invention, the rotation/translation converter gear unit may have an axial friction bearing for the planet wheels of the planetary gear, which is situated between the planet wheels and the rotatable member of the helical gear. Preferably, the centering device has a centering element that at the same time forms the axial friction bearing for the planet wheels.

A further refinement according to the present invention provides that the wheels of the planetary gear have helical gear teeth. In response to a driving under load, helical gear teeth bring about an axial force on the gear wheels. In this embodiment of the invention, the helical gear teeth of the planet wheels or of the wheels of the planetary gear are oriented in such a way that, in response to a working stroke of the axially displaceable member of the helical gear, they act upon the planet wheels in the direction of the axial bearing. The displacement direction of the axially displaceable member of the helical gear in which an axial force acts on the axially displaceable member, or else the axially displaceable member exerts an axial force, or to be more precise, the displacement direction in which the axial force of the axially displaceable member is greater than in the case of an opposite return stroke is denoted as working stroke. This embodiment of the invention assumes that the axial force of the axially displaceable member of the helical gear is different in the two displacement directions. In the case of the greater application of force, the planet wheels are acted upon against the axial bearing and are supported axially by the axial bearing.

The centering device preferably has the axial friction bearing.

In an example embodiment of the present invention, the rotation/translation converter gear unit has an electric motor having a motor shaft that is in alignment with the planetary gear and the helical gear. The sun wheel of the planetary gear is coaxial and rotatably fixed with the motor shaft. The centering device described centers the sun wheel, which is mounted on the motor shaft, between the planet wheels that are disposed on the rotatable member of the helical gear. The development of the invention having the electric motor for the driving of the planetary gear may also be used as actuator, drive or linear drive.

In accordance with a refinement of the present invention, the rotation/translation converter gear unit has a piston-cylinder unit, whose piston is shifted in relation to a cylinder by the axially displaceable member of the helical gear, that is, is driven to execute a stroke. This refinement of the present invention may also be thought of as pressure generator.

In particular, the rotation/translation converter gear unit having the piston-cylinder unit according to an example embodiment of the present invention is provided as pressure generator for a brake control of a hydraulic vehicle brake system. A brake control device a preferably wheel-individual brake-pressure control of vehicle wheels, especially of motor vehicles. Such brake controls are an antilock braking system, traction control system, vehicle dynamics control and/or electronic stability program, for which the abbreviations ABS, TCS, VDC and ESP are customary. Automatic brakings or a brake boost are also possible. The enumeration is by way of example and not an exhaustive list. Such brake controls need a pressure generator or a hydraulic pump, which is formed by the rotation/translation converter gear unit according to the present invention having the piston-cylinder unit. In this context, the cylinder of the piston-cylinder unit is preferably formed in a hydraulic block of the brake control, into which hydraulic components such as solenoid valves of the brake control are inserted and hydraulically interconnected with one another. The hydraulic block has a brake-master-cylinder bore or is connectable to a brake master cylinder, and hydraulic wheel brakes are connectable to the hydraulic block. Such hydraulic blocks for brake controls are conventional and are not explained in greater detail here.

BRIEF DESCRIPTION OF THE DRAWINGS

The present invention is explained in greater detail below on the basis of a specific embodiment shown in the figures.

FIG. 2 shows a view of a centering element of the rotation/translation converter gear unit from FIG. 1.

Figure 1:
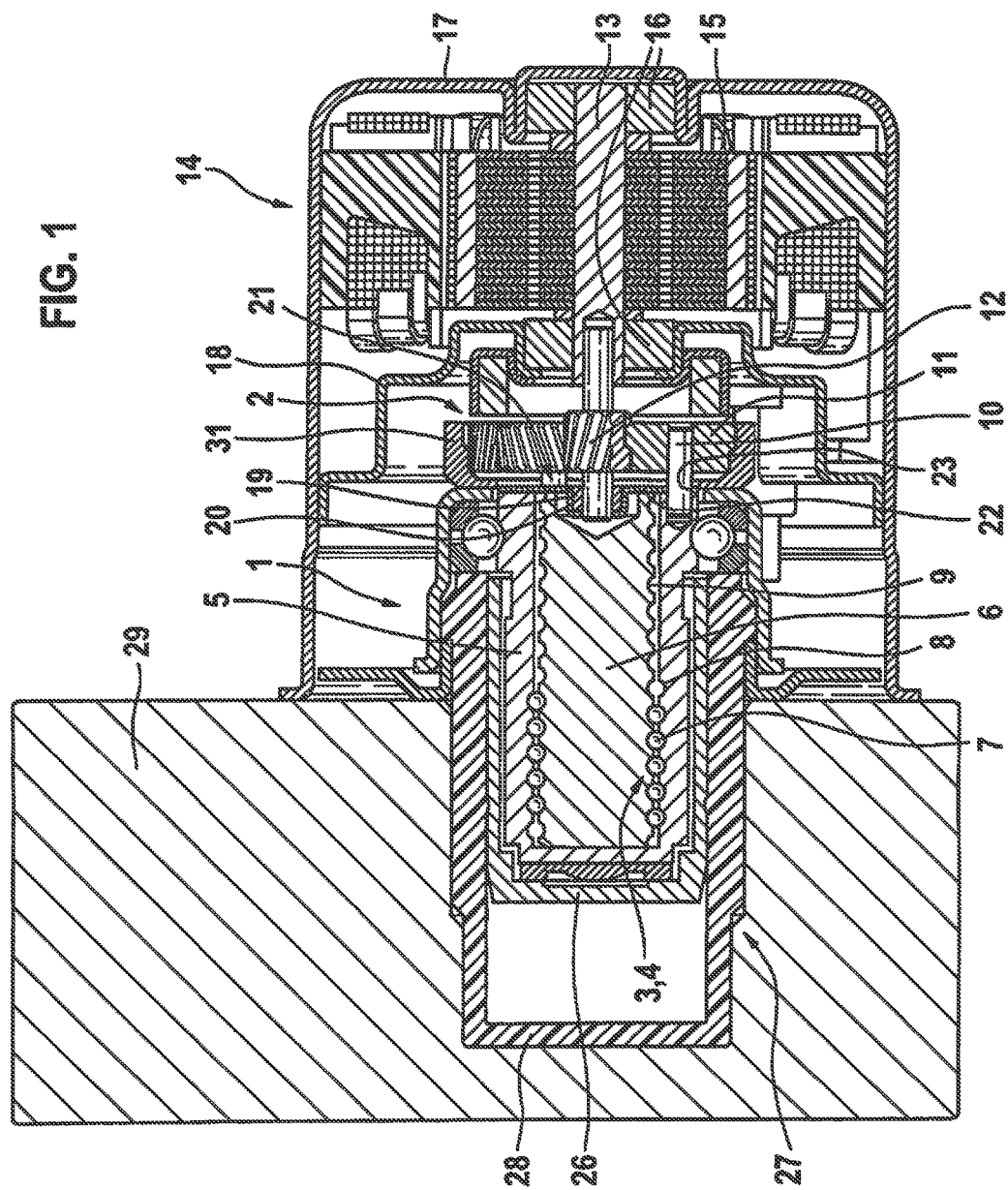
FIG. 1 shows an axial section of a rotation/translation converter gear unit according to the present invention.

The figures are a simplified and schematized representation to permit clarification and comprehension of the present invention.

DETAILED DESCRIPTION OF EXAMPLE EMBODIMENTS

Rotation/translation converter gear unit 1 of the present invention shown in FIG. 1 has a planetary gear 2 and a helical gear 3 that is coaxial with planetary gear 2 and is able to be driven by planetary gear 2. In the specific embodiment of the invention described, helical gear 3 is a recirculating ball gear 4 having a spindle nut 5, a spindle 6 and balls 7 that roll in helical grooves of spindle nut 5 and of spindle 6. The helical grooves of spindle nut 5 and of spindle 6 may also be regarded as thread 8 and mating thread 9. Thread 8 and mating thread 9 mesh with one another via balls 7. In the specific embodiment shown, spindle nut 5 is rotatable and axially fixed; it may also be regarded as rotatable member of helical gear 3. Spindle 6 is rotatably fixed and axially displaceable; in general, it may also be regarded as axially displaceable member of the helical gear. Specific embodiments are also possible in which, conversely, the spindle nut is rotatably fixed and axially displaceable and the spindle is rotatable and axially fixed (not shown).

Spindle nut 5, thus, the rotatable member of helical gear 3, is formed as planet carrier of planetary gear 2: At its end face facing planetary gear 2, it has eccentrically disposed, axially parallel pins as shafts 10 for three planet wheels 11 that are rotatably mounted on shafts 10. Shafts 10 and planet wheels 11 are distributed uniformly over the circumference, which, however, just like the number of three planet wheels 11, is not essential for the invention.

Planet wheels 11 mesh with an internal gear 31 which encircles them and which is disposed in rotatably fixed manner in a motor housing 17 of an electric motor 14.

Between planet wheels 11, planetary gear 2 has a sun wheel 12 that meshes with planet wheels 11. Sun wheel 12 is pressed onto a motor shaft 13 of electric motor 14, that is, sun wheel 12 is coaxial and rotatably fixed, i.e., rigid with motor shaft 13, which on its part, is in alignment with planetary gear 2 and helical gear 3. Motor shaft 13 is rotationally mounted on both sides of a rotor 15, in the specific embodiment described and illustrated, by ball bearings 16 in motor housing 17 and in an end shield 18 pressed into motor housing 17. In addition, motor shaft 13 is rotationally mounted on a side of planetary gear 2 facing away from electric motor 14 by a pivot bearing, this pivot bearing in the specific embodiment being a friction-bearing ring denoted hereinafter as friction bearing 19. Friction bearing 19 is accommodated in a bearing seat 20 of a centering device 21 that has a circular-disk-shaped centering element 22, which is shown as a single part in FIG. 2. Centering element 22 has a collar in the shape of a cylindrical tube, having an inward flange at one end that forms bearing seat 20 for friction bearing 19. Circular-disk-shaped centering element 22 is disposed between planetary gear 2 or its planet wheels 11 and helical gear 3 or its spindle nut 5 that forms the rotatable member of helical gear 3 and the planet carrier of planetary gear 2. Centering element 22 has three holes 23, 24, 25 for the passage of shafts 10 of planet wheels 11, FIG. 2 depicting shafts 10, as well as friction bearing 19 of motor shaft 13 of electric motor 14 and motor shaft 13 itself. Generally expressed, centering element 22 has one hole 23, 24, 25 for each shaft 10 of each planet wheel 11, and in the middle between holes 23, 24, 25, bearing seat 20 for friction bearing 19 of motor shaft 13.

One of the three holes 23 of centering element 22 is a locating hole 23; it has the same diameter as shaft 10 of one of planet wheels 11, and thereby aligns centering element 22 on this shaft 10. A second hole 24 in centering element 22 is an elongated hole 24 that is as wide as a diameter of shaft 10 of another of planet wheels 11 and whose longitudinal centerline 32, extended beyond elongated hole 24, intersects an axis of locating hole 23. Together with locating hole 23, elongated hole 24 determines an angular position and therefore a position of centering element 22 overall in relation to shafts 10 and consequently in relation to planet wheels 11 of planetary gear 2. Third shaft 10 of third planet wheel 11, or in general, all further shafts 10 of further planet wheels 11 are secured in position via spindle nut 5, which forms the planet carrier, in relation to first and second shaft 10, so that by the fixing of centering element 22 on the first two shafts 10, the position of centering element 22 is established in terms of all shafts 10 and all planet wheels 11. With centering element 22, friction bearing 19 of motor shaft 13 is centered, and with motor shaft 13, which also forms a shaft of sun wheel 12, sun wheel 12 is centered between planet wheels 11. The centering of sun wheel 12 in relation to planet wheels 11 is important, because sun wheel 12 is retained on motor shaft 13, i.e., on electric motor 14, whereas planet wheels 11 are retained on spindle nut 5 that forms the planet carrier. A misalignment of electric motor 14 in relation to helical gear 3 would result in a misalignment of sun wheel 12 in relation to planet wheels 11. Centering element 22 improves the centering of sun wheel 12 in relation to planet wheels 11.

Helical gear 5 is able to be driven by electric motor 14 via planetary gear 2, helical gear 5 converting a rotating drive movement of electric motor 14 into a translatory output movement of spindle 6. Together with electric motor 14, rotation/translation converter gear unit 1 may also be understood as actuator, drive or linear drive.

At the same time, circular-disk-shaped centering element 22 also forms an axial friction bearing for planet wheels 11. The gear wheels of planetary gear 2 have helical gear teeth which, in response to a rotational driving at least under load, produce an axial force on the gear wheels. The helical gear teeth are oriented in such a way that in response to a working stroke of spindle 6, planet wheels 11 are acted upon in the direction of spindle nut 5. In the face of these axial forces taking effect in response to a working stroke under load, planet wheels 11 are braced via the axial friction bearing, which forms centering element 22, against spindle nut 5. A shift of spindle 6 away from planetary gear 2 and electric motor 14 is denoted as working stroke. In general, an axial displacement of spindle 6 is denoted as working stroke in which an axial force acts on spindle 6, or spindle 6 exerts an axial force, or at any rate, this axial force is greater than in the case of the opposite displacement of spindle 6 which is referred to as return stroke.

Spindle 6 has a piston 26 of a piston-cylinder unit 27, whose cylinder 28 is disposed in a bore hole in a hydraulic block 29. Hydraulic block 29 is part of a brake control of a hydraulic vehicle brake system (not shown), with which wheel braking forces of hydraulic wheel brakes, that are connected to hydraulic block 29, are controllable individually for each wheel. Such brake controls are, inter alia, antilock braking systems, traction control systems and vehicle dynamics controls or electronic stability programs, for which the abbreviations ABS, TCS, VDC and ESP are customary. For the brake control, hydraulic block 29 is fitted with hydraulic components (not shown) such as solenoid valves, that are interconnected with each other by hydraulic block 29 and with piston-cylinder unit 27. Hydraulic block 29 may have a brake-master-cylinder bore hole or is connectable hydraulically to a brake master cylinder not shown). Such hydraulic blocks and brake controls are well-known and are not explained in greater detail here. Together with piston-cylinder unit 27, rotation/translation converter gear unit 1 forms a pressure generator or a piston pump of such a brake control.

What is claimed is:

1. A rotation/translation converter gear unit, comprising:
   a planetary gear;
   a helical gear having a rotatable, axially fixed member having a thread, the rotatable member having a planet carrier having planet wheels of the planetary gear;
   an axially displaceable, rotatably fixed member having a mating thread, the mating thread configured to mesh with the thread of the rotatable member so that a rotational driving of the rotatable member axially displaces the axially displaceable member; and
   a centering device that centers a sun wheel of the planetary gear between the planet wheels, wherein the centering device has holes for shafts of the planet wheels and of the sun wheel, with whose aid the centering device centers the sun wheel between the planet wheels, and wherein the centering device is disposed between the helical gear and the planetary gear.

2. The rotation/translation converter gear unit as recited in claim 1, wherein the centering device has a locating hole for a shaft of one planet wheel that aligns the centering device on this shaft, and an elongated hole for a shaft of another planet wheel, whose longitudinal centerline, extended beyond the elongated hole, intersects an axis of the locating hole, and which, together with the locating hole, aligns the centering element at an angular position.

3. The rotation/translation converter gear unit as recited in claim 1, wherein the centering device has a pivot bearing for the sun wheel.

4. The rotation/translation converter gear unit as recited in claim 1, wherein the rotation/translation converter gear unit has an axial friction bearing for the planet wheels of the planetary gear, which is disposed between the planet wheels and the rotatable member of the helical gear.

5. The rotation/translation converter gear unit as recited in claim 4, wherein the planet wheels have helical gear teeth which, in response to a working stroke of the axially displaceable member of the helical gear, act upon the planet wheels in the direction of the axial friction bearing.

6. The rotation/translation converter gear unit as recited in claim 4, wherein the centering device has the axial friction bearing.

7. The rotation/translation converter gear unit as recited in claim 1, wherein the rotation/translation converter gear unit has an electric motor whose motor shaft is in alignment with the planetary gear and the helical gear, and with whose motor shaft, the sun wheel of the planetary gear is coaxial and rotatably fixed.

8. The rotation/translation converter gear unit as recited in claim 1, wherein the rotation/translation converter gear unit has a piston-cylinder unit, and the axially displaceable member of the helical gear axially displaces a piston of the piston-cylinder unit in relation to a cylinder of the piston-cylinder unit.

9. The rotation/translation converter gear unit as recited in claim 8, wherein the rotation/translation converter gear unit forms a pressure generator for a brake control of a hydraulic vehicle brake system.

10. The rotation/translation converter gear unit as recited in claim 1, wherein the centering device has a circular-disk-shaped body.

* * * * *